United States Patent Office 3,594,270
Patented July 20, 1971

3,594,270
UPGRADING UNBLEACHED SULFITE PULPS
Walter C. Schattner, Webster, and Frank L. Wells, Fairport, N.Y., assignors to Eastman Kodak Company, Rochester, N.Y.
No Drawing. Continuation-in-part of application Ser. No. 702,545, Feb. 2, 1968. This application Mar. 24, 1970, Ser. No. 22,370
Int. Cl. D21c 3/06
U.S. Cl. 162—80     5 Claims

ABSTRACT OF THE DISCLOSURE

Unbleached sulfite wood pulps can be upgraded to "esterification grade" via processes having excellent yields, which processes comprise the essential step of treating the unbleached sulfite pulp with a hot (60° C. or higher) aqueous solution containing strong alkali and at least about 1 weight percent of an inorganic boron compound dissolved therein.

---

This is a continuation-in-part application of U.S. application Ser. No. 702,545 filed Feb. 2, 1968 by Walter C. Schattner and Frank L. Wells and now abandoned.

The present invention relates to processes involving the treatment of unbleached sulfite pulps in order to significantly improve their quality for use in the manufacture of cellulose esters having good color and acceptable clarity.

Conventional processes for converting unbleached sulfite pulps to "esterification grade" cellulose that approaches cotton linters in quality for this purpose involve at least three separate treatment steps:

(1) treatment with chlorine (generally as chlorine gas) to convert the lignin remaining in the sulfite pulp to a form which is soluble in water and/or aqueous alkali solutions;

(2) a hot, dilute treatment with alkali (generally involving "cooking" the pulp at least an hour at 120–150° C. in an aqueous solution containing 1–2% NaOH), and finally;

(3) a relatively cooler (ca. 10–40° C.) treatment step for at least an hour with a concentrated solution (8–12%) of NaOH. These steps are then usually followed by a bleaching procedure involving treatment of the resulting purified pulp with hypochlorite or chlorine dioxide bleaching solution. Steps (2) and (3) can sometimes be reversed in order if desired.

Unfortunately, such treatment invariably results in a substantial loss of usable pulp material to the extent that yields (based on unbleached pulp) of, at most, only about 70% (often as low as 60%) are to be expected when such conventional upgrading processes are practiced. Such a very low yield makes this conventional process commercially relatively unattractive. Although the elimination of the hot treatment step (involving dilute caustic treatment) from this procedure results in substantially improved yields, it also results in products that are not considered to be acceptable "esterification grade" materials because of the poor color and poor clarity of esterified products made from them.

"Esterification grade" cellulose materials are recognized by those in the art as yielding cellulose esters (such as cellulose acetate, for example) having color and clarity of sufficiently high quality to make them acceptable for use in the production of yarn, photographic film base, transparent coverings, molded plastic articles, and the like. Acceptable "color" has been established to mean "color" values (of cellulose acetate, for example) of at most about 250, as measured by direct comparison with color standards prepared as described by J. A. Mitchell in TAPPI, vol. 40, pg. 713 (1957) after the cellulose acetate was made by the standardized process (by L. E. Herdle, L. H. Pancoast, Jr. and R. H. MacClaren) set out in TAPPI, vol. 47, No. 10, pages 617 and 618 (1964). Acceptable clarity (or "haze" values) of the final cellulose acetate products are those that are assigned a value of at least about 15 (in terms of centimeters) when it is measured by determining the depth into a Nessler tube filled with the solution being measured to which the lower end of an L-shaped polished stainless steel wire 0.060 inch in diameter can be seen as it is gradually lowered into the tube. During this test for "clarity," illumination is provided from the side of the Nessler tube with diffuse fluorescent light.

It is a major object of the present invention to provide more economical processes for substantially upgrading unbleached sulfite wood pulp. It is another major object of this invention to provide processes for manufacturing "esterification grade" wood cellulose from unbleached sulfite pulps, which processes result in surprisingly high yields of useful product.

It has now been discovered that these objects, as well as others that will become evident from the following discussion and claims, can be accomplished by holding an unbleached sulfite pulp in contact with a hot (at least 60° C.) solution containing, dissolved therein, (1) at least about 8 weight percent of sodium hydroxide, and (2) at least about 1 weight percent of a meta-borate, and/or borax for a period of time sufficient to accomplish the necessary upgrading of the pulp. The unbleached pulp may be treated in this fashion either before or after the conventional treatment with chlorine to convert the lignin remaining in the sulfite pulp to a form which is soluble in water and/or aqueous alkali solutions.

The sulfite pulps that are preferred as raw materials for the present processes are those that have been treated by conventional "sulfite" pulping processes so that the greatest proportion of the lignin and carbohydrates that were originally contained in the wood chips from which they were derived has been removed. However, such preferred "unbleached" sulfite pulps still normally contain some lignin (i.e., from about 2 to about 5 weight percent) and some carbohydrates (i.e., from about 4 to about 10 weight percent). However, as already described above unbleached pulps which have not been chlorinated in the conventional fashion may also be treated in accordance with the method of this invention and then subsequently chlorinated to improve the solubility of the lignin. Thus, "useful" sulfite pulps are those that are unbleached and that have or have not been treated with a material to make its lignin soluble in aqueous caustic (for example, to the extent of at least about 1 weight percent in a 5% aqueous solution of sodium hydroxide), such as a chlorinating material like Cl₂ or chlorine dioxide, to solubilize at least half of the lignin remaining in the unbleached sulfite pulp although materials so treated are preferred.

While the particular wood from which the sulfite pulps have been derived (such as spruce, hemlock, southern pine, gumwood, maple, etc.) has some influence upon the ultimate levels of color and haze in the final esterified products (hemlock and spruce are preferred for this reason), the present processes can be practiced successfully no matter what type of commercial sulfite pulp is utilized. Sulfite pulps (unbleached) that contain up to 5 percent of lignin generally have Kappa numbers of at most about 30. It is these pulps that are the raw materials for the processes of the present invention.

In a preferred overall process involving the treatment of unbleached sulfite pulp, a preliminary chlorination treatment (via well known manipulative procedures, using chlorine gas, or some other well known chlorinating agent to convert the remaining lignin into the required solubilizable state) is initially undertaken. Such chlorination procedures are well known and need not be detailed here. Actually, the particular way in which the remaining lignin is converted into the caustic-soluble form either before or after treatment with the hot alkali solution described herein is not critical with respect to the successful practice of the present processes.

The most critical aspect of the present invention relates to the contacting of the "chlorinated" or "unchlorinated" sulfite pulp with a hot aqueous solution containing, dissolved therein at least about 8 weight percent of NaOH and an effective amount of a useful boron compound (such as sodium borate, sodium metaborate, borax, $Na_2B_4O_7$, or perborate) for at least about 15 minutes (preferably from about 30 minutes to about 2 hours), although still longer contacting periods are sometimes useful. The temperature of the resulting slurry during this "contacting" period must be at least 60° C. or more (under pressure, if desired), and is preferably within the range of from about 80° to about 115° C. When this preferred temperature range is utilized, it is preferred to use between about 4 and about 8 weight percent of the boron compound (calculated as borax, anhydrous bases) and at least about 10 weight percent of NaOH. However, at the relatively lower temperature (i.e., between about 60° C. and about 80° C.), as little as 1 weight percent of the boron compound can be effectively utilized. Similarly, whereas the use of as much as 20 weight percent or more of NaOH in these strong caustic solutions can physically be used in the successful practice of this invention, generally additional benefits cannot be observed when the concentration of NaOH goes beyond about 15 weight percent.

The reasons for the successful results that can be obtained via the present processes cannot readily be explained. Thus, a study of the various components of the pulps that do, and those that do not, yield the valuable benefits attributable to the present processes seem to indicate that there is no difference between the pulps. Yet the pulp treated in accordance with the present processes yields acceptable "esterification grade" sulfite pulps, whereas sulfite pulps treated in other relatively inexpensive ways do not.

Evaluation of pulps

The following standard tests are carried out in order to evaluate the variously treated sulfite pulps to determine whether or not the treatments result in acceptable "esterification grade" pulp. The tests are described in TAPPI, vol. 47, No. 10, October 1964, pages 617–620.

(A) Acetylation procedure.—Nine grams of cellulose, 1 part (dry basis) are dewatered with glacial acetic acid and adjusted to contain 2.5 parts of acid. (For "raw material" in this step, dry pulp must first be thoroughly wet with water, while water-wet pulp can be used directly.) Pretreatment is carried out in a 16-oz. bottle for 1 hour at 38° C. using 3% $H_2SO_4$ (based on the cellulose) in an additional 5.5 parts of glacial acetic acid. After cooling to 18° C., the sample is esterified by adding 0.04 parts $H_2SO_4$, 0.5 parts glacial acetic acid and 3.7 parts acetic anhydride. After thorough mixing, the bottle of material is rolled for 1 hour at 38° C. Then a solution of 0.5 parts water in 3 parts glacial acetic acid is added (to hydrolyze excess anhydride).

(B) "Color" determination.—Within 2 hours of the time the esterification is completed, "color" is determined by direct comparison with standards prepared as described by J. A. Mitchell in TAPPI, vol. 40, page 713 (1957). Relatively larger "color" numbers are assigned to the more highly colored samples.

(C) "Clarity" or "Haze" determination.—Within 2 hours of the time the esterification is completed, "clarity" is determined by pouring the sample into a Nessler tube lighted from the side with diffused fluorescent light. Into the tube an L-shaped, polished, stainless steel wire 0.060 inch in diameter is slowly lowered until the lower end of the rod cannot be seen from the surface. The depth in centimeters at this point is the "clarity" of the sample.

In the following examples, all "parts" are by weight unless otherwise specified.

EXAMPLE 1

(A) Chlorination step. — Two hundred parts of bleached hemlock sulfite pulp (Kappa No. 20.5) containing 3.5 weight percent of lignin and 6 weight percent of pentosans are stirred into 6,000 parts of water containing 4 weight percent of chlorine dissolved therein. The resulting slurry is then held at 20° for 1 hour. At the end of this time, practically all of the lignin is converted into a form that is soluble in dilute aqueous solutions of alkali. The slurry is then filtered, and the resulting filter cake washed 3 times with water.

(B) Strong alkali refining step.—The washed filter cake from the chlorination step A, above, is blended with 5,000 parts of an aqueous solution containing, dissolved therein, 12 weight percent of NaOH and 2 weight percent of $Na_2B_4O_7$ (anhydrous basis). This blend is then held at a temperature of 60° C. for 1 hour, with only intermittent stirring. At the end of this refining step, the aqueous solution (containing practically all of the solubilized lignin and a large part of the pentosans from the unbleached, chlorinated pulp) is then filtered away from the refined pulp by conventional means. The refined pulp is then rinsed several times with water to remove excess caustic and borax.

Subsequent to the refining step, the refined pulp is bleached (by conventional means) by treating it with 3,000 parts of water containing, dissolved therein, 2 parts of $ClO_2$ at a pH of 4–5 at 85° C. for about 3 hours, followed by treatment with 6,000 parts of a 0.5 weight percent aqueous solution of HCl.

After filtration, it is found that 166.2 parts of refined bleached pulp remain. This represents a yield of over 83%, based on the amount of unbleached sulfite pulp used initially.

(C) Evaluation.—Eightly parts of the refined, bleached pulp product from Example 1 are dewatered conventionally with glacial acetic acid and adjusted to contain 50 parts of acetic acid. This material is then "activated" and acetylated according to the method described above under the heading, "Evaluation of Pulps," part A.

As a "control" experiment, the above procedure is followed, except that the $Na_2B_4O_7$ is omitted from the aqueous caustic solution in the refining step. In Table I, below are summarized the results of these tests:

TABLE I
[Refining Step Conducted at 60° C.]

| | Example I | Control |
|---|---|---|
| Refinement solution | 12% NaOH plus 2% $Na_2B_4O_7$. | 12% NaOH alone. |
| Color | 210 | 300. |
| Clarity, cm | 16 | 8. |
| Percent yield [1] | 83.1 | 83.0. |

[1] Based upon unbleached sulfite pulp starting material.

Note that the use of borax in the strong alkali solution during the refining step resulted in the production of bleached sulfite pulp of a quality that is completely satisfactory for use in the manufacture of acetylated cellulose yarns or the like, whereas via a conventional refining procedure, the quality of the pulp product is not satisfactory for such an end use. Thus, via the practice of this invention, unbleached sulfite pulps can be upgraded to a much greater extent than was heretofore believed possible.

EXAMPLE 2

The procedure of Example 1, above, is followed, except that unbleached spruce pulp, containing about 3 weight percent of lignin and about 3.5 weight percent of pentosans, and having a Kappa No. of 13 is used in place of the unbleached hemlock sulfite pulp. From the refined pulp can be produced (via the standard test procedure) cellulose acetate yielding a "color" value of 200 and a clarity value of 18 cm.

While in Examples 1 and 2 above, the surprising degree of upgrading of unbleached sulfite pulps to "yarn" quality was demonstrated by treating the chlorinated pulp at relatively low temperatures, it has now been discovered that still further "upgrading" is possible via the use of relatively higher temperatures during the strong alkali refining step of the present processes. Thus, not only can pulps be obtained that are practically the ultimate in the important properties of "color" and "clarity" (which can be actually as excellent as those derived from the trade standard, cotton linters), but also, treatment of unbleached sulfite pulps with strong alkali (as described above) at temperatures above about 60° C., and preferably at temperatures within the range of from about 80° C. to about 115° C. (in conjunction with the dissolved boron compound), results in still another unexpected and valuable improved property (of the pulp products of this invention); namely, that property that permits the pulp products to be esterified without the need for the usual so-called "activation" step with water and strong acid prior to the esterification step. This is surprising particularly in view of the fact that when temperatures of about 50° C. or lower are utilized in processes that are otherwise manipulatively similar to those of the present invention, the need for the "activation" step still exists. These additional valuable results that can be obtained by practicing this particular preferred embodiment of the present invention are illustrated by the following examples.

EXAMPLE 3

Example 2, above, is followed in detail, except that a temperature of 80° C. is utilized during the strong alkali-borax solution refining step. Results of tests performed on the resulting pulp are summarized in Table II, below. In this instance, the water "activation" step is omitted during the preparation of the cellulose acetate test solution.

TABLE II
[Refining step conducted at 80° C.]

| | Product of Example 3 | Control | Standard [1] |
|---|---|---|---|
| Refining solution | 12% NaOH plus 2% $Na_2B_4O_7$ | 12% NaOH alone | |
| Color | 235 | 350 | 200 |
| Clarity, cm | 15 | 8 | 15 |
| Yield [2] | 78 | 75 | 62 |

[1] Commercially purchased "esterification grade" cellulose, made by refining the pulp at a temperature of 125° C.–135° C. in dilute NaOH, followed by treating with 12% NaOH and subsequently bleaching hemlock pulp.
[2] Based on the initial amount of unbleached sulfite pulp used.

When optimum results are desired in the practice of this aspect of the present invention, boron compound levels of between about 4 and about 8 weight percent (calculated as anhydrous $Na_2B_4O_7$) should be utilized, as illustrated in Example 4, below, while relatively higher temperatures during the strong alkali-borax refining step (up to about 115° C.) produce still better (color and clarity) results, as illustrated in Example 5.

EXAMPLE 4

The procedure of Example 3, above, is followed, except that 6 weight percent of $Na_2B_4O_7$ is used, rather than only 2%. Evaluation results from this experiment are summarized in Table III, below.

EXAMPLE 5

The procedure of Example 4, is followed, except that a temperature of 100° C. is maintained during the "strong alkali-borax" refining step. Results from the evaluation of the resulting refined, bleached pulp are set out in Table III, below.

In Table III, there is also presented data comparing the acetylated pulp products from Examples 4 and 5, above, with acetylated cotton linters:

TABLE III

| | Product of Example 4 | Product of Example 5 | Product from cotton linters |
|---|---|---|---|
| Refining solution | 12% NaOH plus 6% $Na_2B_4O_7$ | 12% NaOH plus 6% $Na_2B_4O_7$ | |
| Refining Temperature, ° C. | 80 | 100 | |
| Color | 160 | 90 | 60 |
| Clarity, cm | 20 | 35+ | 35+ |
| Yield, percent | 78 | 75 | |

From the foregoing, it can be seen that the use of the combination of (a) high temperatures, and (b) relatively higher levels of boron compound during the "strong alkali-borax" refining step of the present processes results in the production of pulps in surprisingly high yield and having surprisingly excellent color and clarity properties, and also results in the still further benefit in that such products do not need the usual "activation" step prior to their esterification.

EXAMPLE 6

The method of Example 3 above is followed in detail except that the sulfite pulp was treated in a sequence of initially extracting in a 12 percent sodium hydroxide, 6 percent borax solution followed by chlorination, weak alkali wash, acidified sodium chlorite bleach, and hydrochloric acid acidification. Results of tests performed on the resulting pulps are summarized in Table IV below:

TABLE IV
[Refining step conducted at 80° C.]

| | Product of Example 6 | Standard [1] |
|---|---|---|
| Refining solution | 12% $Na_2B_4O_7$ plus 6% $Na_2B_4O_7$ | |
| Color | 160 | 200 |
| Clarity, cm | 17 | 15 |
| Yield, percent [2] | 84.4 | 62 |
| Viscosity, sec | 24 | 111 |

[1] Commercially purchased "esterification grade" cellulose, made by, refining the pulp at a temperature of 125° C.–135° C. in dilute NaOH, followed by treating with 12% NaOH and subsequently bleaching hemlock pulp.
[2] Based on the initial amount of unbleached sulfite pulp used.

Acetylation solution properties indicate that extraction with strong alkali-borax solution prior to chlorination is as effective as when the extraction step follows chlorination. As shown in Table IV, acetate solution clarity of the product is equal to that of the commercial comparison and solution colors are better. Intrinsic viscosity of this product in cupriethylenediamine solution was lower when the procedure of this example was used and this is reflected in the lower dope viscosity which can be compensated for later by adjustment of the esterification formula later in the preparation of the ester.

Although it is difficult to compare the yields of the two different treatment sequences, it appears that there is a slight yield advantage, on the order of about 2 percent, when the alkali-borax extraction is the initial step of the treatment assuming a normal laboratory yield loss of 5 percent is allowed for the stages after the initial alkali-borax step.

Thus, there is apparently little if any change noted when the alkali-borax treatment is carried out before chlorination and this sequence provides benefits similar to those demonstrated using a sequence which calls for performing the chlorination before the alkali-borax treatment.

Evendiently, the particular identity of the inorganic boron compound that is used to make up the "strong alkali-borax" refining solutions of this invention is not critical, insofar as the successful practice of the present invention, is concerned. Probably, this is because of the very strong alkalinity of such solutions due to the presence of so much dissolved NaOH. Thus, similar successful results can be obtained when other inorganic alkali metal-boron compounds are used in amounts equivalent to the amounts of $Na_2B_4O_7$ (based on their B-content) used in the foregoing examples. For example, a 12 weight percent aqueous solution of NaOH+3 weight percent of $H_3BO_3$ functions very much like an aqueous solution of 9 weight percent of NaOH+about 12 weight percent of $Na_2B_4O_7 \cdot 10H_2O$. Similarly 6 weight percent of $Na_2B_4O_7$ (anhydrous basis) is apparently the same functionally as 12 weight percent of $$Na_2B_4O_7 \cdot 10H_2O$$

which, in turn, functions in 12% NaOH solution like 13.5% of sodium metaborate ($NaBO_2 \cdot 2H_2O$), insofar as the successful practice of the present invention is concerned. Also, special note should be made that, although the only strong alkali referred to specifically above is sodium hydroxide and the only alkali metal boron compounds referred to above are sodium salts, any strong alkali (such as lithium, potassium, rubidium, sodium hydroxides and the like, as well as mixtures thereof) can be used. Also, any of the alkali metal borates, metaborates and the like, as well as mixtures thereof can be used in the successful practice of this invention.

The invention has been described in detail with particular reference to preferred embodiments thereof, but it will be understood that variations and modifications can be effected within the spirit and scope of the invention as described hereinabove and as defined in the appended claims.

We claim:

1. A process for converting unbleached sulfite wood pulp into esterification grade pulp suitable for use without further refinement and without further activation in the preparation of cellulose esters having acceptable color and haze values; which process comprises contacting in a refining step said unbleached sulfite wood pulp for at least about 15 minutes at a temperature between about 60° C. and about 150° C. with an aqueous solution containing, dissolved therein, at least about 8 weight percent of an alkali metal base and at least 1 weight percent, calculated as $M_2B_4O_7$, of a boron compound selected from the group consisting of alkali metal metaborates, alkali metal borates, boric acid, hydrates thereof, and mixtures thereof; wherein M is an alkali metal cation.

2. A process as in claim 1, wherein said alkali metal base is sodium hydroxide.

3. A process as in claim 2, wherein said temperature is from about 80° C. to about 115° C. the concentration of said boron compound is within the range of from about 4 to about 10 weight percent, and the concentration of said sodium hydroxide is within the range of from about 8 to about 18 weight percent; said process also including the step of subsequently bleaching the resulting refined sulfite wood pulp to thereby produce said esterification grade pulp.

4. A process as in claim 1, wherein said refining step is preceded by a chlorination step which comprises contacting unbleached sulfite wood pulp containing from about 2 to about 5 weight percent of lignin and from about 4 to about 10 weight percent of pentosans and having a Kappa number of at most about 30 for at least about 15 minutes with an aqueous solution of chlorine to thereby convert at least half of said lignin to a chlorinated form which is soluble in dilute aqueous alkali solution.

5. A process as in claim 3, wherein said refining step is preceded by a chlorination step which comprises contacting unbleached sulfite wood pulp containing from about 2 to about 5 weight percent of lignin and from about 4 to about 10 weight percent of pentosans and having a Kappa number of at most about 30 for at least about 15 minutes with an aqueous solution of chlorine to thereby convert at least half of said lignin to a chlorinated form which is soluble in dilute aqueous alkali solution.

References Cited
UNITED STATES PATENTS 3,068,141   12/1962   MacCloren et al. _____ 162—80
3,305,433   2/1967   Partlow _____ 162—80

S. LEON BASHORE, Primary Examiner

T. G. SCAVONE, Assistant Examiner

U.S. Cl. X.R.

8—107; 162—86